United States Patent
Gray

[11] Patent Number: 5,823,599
[45] Date of Patent: Oct. 20, 1998

[54] MECHANIZED FLOOR CONSOLE

[75] Inventor: John D. Gray, Union, N.H.

[73] Assignee: Textron Automotive Company Inc., Troy, Mich.

[21] Appl. No.: 707,527

[22] Filed: Sep. 4, 1996

Related U.S. Application Data

[60] Provisional application No. 60/003,302, Sep. 6, 1995.

[51] Int. Cl.$^6$ .................................................. B60R 11/02
[52] U.S. Cl. .......................................... 296/37.8; 224/929
[58] Field of Search ................................ 296/37.8, 37.7; 224/539, 282, 929

[56] References Cited

U.S. PATENT DOCUMENTS

| | | | |
|---|---|---|---|
| 3,926,473 | 12/1975 | Hogan | 297/115 |
| 4,818,008 | 4/1989 | Cressoni | 296/37.8 |
| 4,848,627 | 7/1989 | Maeda et al. | 224/275 |
| 4,877,287 | 10/1989 | Escaravage | 297/417 |
| 4,878,438 | 11/1989 | Carver | 108/44 |
| 4,934,750 | 6/1990 | Eichler et al. | 296/37.8 |
| 4,940,275 | 7/1990 | Miki et al. | 296/37.8 |
| 4,998,770 | 3/1991 | Shimizu et al. | 296/37.8 |
| 5,085,481 | 2/1992 | Fluharty et al. | 296/37.8 |
| 5,104,186 | 4/1992 | Kwasnik et al. | 297/194 |
| 5,106,143 | 4/1992 | Soeters | 296/37.8 |
| 5,112,094 | 5/1992 | Kribs | 296/37.8 |
| 5,131,716 | 7/1992 | Kwasnik et al. | 297/194 |
| 5,188,423 | 2/1993 | Meiller et al. | 297/412 |
| 5,338,081 | 8/1994 | Young et al. | 296/37.8 X |
| 5,397,160 | 3/1995 | Landry | 296/37.8 |
| 5,609,382 | 3/1997 | Schmid et al. | 296/37.8 |

FOREIGN PATENT DOCUMENTS

| | | | |
|---|---|---|---|
| 361077542 | 4/1986 | Japan | 224/929 |
| 405193420 | 8/1993 | Japan | 224/539 |

*Primary Examiner*—Joseph D. Pape
*Attorney, Agent, or Firm*—Reising, Ethington, Learman & McCulloch, PLLC

[57] ABSTRACT

A vehicle passenger compartment floor console includes a module receptacle and a plurality of interchangeable storage and appliance modules designed to fit within the module receptacle. The floor console may also include a drum-type carrousel supported for rotation about a generally horizontal axis within the console outer shell. The carrousel holds three storage modules and is positioned to sequentially rotate each module past an access opening cut or formed through the console outer shell. A passenger compartment occupant may use the console to selectively present any one of a number of interchangeable modules for occupant access while traveling.

11 Claims, 3 Drawing Sheets

MECHANIZED FLOOR CONSOLE

CROSS REFERENCE TO RELATED CASES

Applicant hereby incorporates by reference Provisional application Ser. No. 60/003,302 filed Sep. 6, 1995, entitled "MECHANIZED CONSOLE/CONSOLE CARROUSEL" (attorney docket No. PR-302-DRD).

TECHNICAL FIELD

This invention relates generally to a floor console for a motor vehicle and, more particularly, to a floor console with interchangeable storage modules.

BACKGROUND OF THE INVENTION

It is desirable for motor vehicle floor consoles to include storage compartments for storing loose items and receptacles for housing accessories such as radios, tape decks, CD players, citizens' band radios, and the like. Including such items and accessories within a floor console allows vehicle occupants to easily see and reach the items and accessories while the vehicle is underway.

Current consoles include fixed storage compartments for loose items and permanent receptacles and mounting systems for various accessories. For example, U.S. Pat. No. 5,106,143 issued Apr. 21, 1992 to Soeters discloses an automotive floor console including a main body 20 with storage compartments 27, 28. The storage compartments 27, 28 are fixed within the console main body 20. The Soeters floor console includes no provision for allowing occupants to interchange storage modules.

U.S. Pat. No. 3,926,473 issued Dec. 16, 1975 to Hogan discloses an adjustable center armrest unit with "wings" 7 that adjust laterally outward from a main body portion 1 revealing a fixed, non-removable storage compartment 27. As with the Soeters console, and other consoles in the prior art of record, the Hogan console does not provide for the interchange of storage or accessory modules.

What is needed is a console system that allows occupants to select various interchangeable storage and accessory modules that the occupants can then have access to while the vehicle is under way.

SUMMARY OF THE INVENTION

In accordance with this invention a motor vehicle floor console assembly is provided that includes a module receptacle and at least two interchangeable storage and appliance modules each having exterior dimensions that allow the modules to fit within the same module receptacle. Occupants may select any one of the available modules and insert the selected module into the module receptacle for convenient occupant access while the vehicle is under way.

In accordance with one aspect of this invention, at least one of the interchangeable storage and appliance modules includes an electrical hook-up that cooperates with an electrical hookup in the module receptacle to either provide electrical power or transmit electrical signals. Such a hookup allows occupants to plug-in various types of appliances to include hairdriers, computers, cellular telephones, etc.

In accordance with another aspect of this invention, the console assembly includes a console-repositioning mechanism that allows for independent vertical, horizontal and lateral console adjustment. Occupants may use the repositioning mechanism to move the entire console to a more convenient position for module access or to a more comfortable position for occupant arm support.

In accordance with another aspect of this invention, the console assembly includes a stowable lap-table. An occupant may deploy the lap table for use as a writing surface or as a support platform for a computer or food items.

In accordance with another aspect of this invention, a method is provided for storing and gaining access to frequently-used travel items and vehicle accessories in a vehicle passenger compartment floor console assembly. The method includes the steps of selecting a module, removing any module presently occupying the module receptacle, and replacing that module with the selected module.

In accordance with another aspect of this invention, the console assembly includes a positioning apparatus movably supported within the console body that supports at least two storage modules for movement into a displayed position adjacent an access opening in the console. The positioning apparatus provides occupants with selective access to any of the modules and their respective contents at any time while traveling.

In accordance with another aspect of this invention, the positioning apparatus includes an electro-mechanical occupant-actuated drive mechanism. At the touch of a button, an occupant can actuate this drive mechanism to rotate an assortment of modules or compartments through a display position adjacent the console access opening.

In accordance with another aspect of this invention, the positioning apparatus includes an occupant-actuated automatic module selection system. The automatic system automatically moves a selected module into the display position in response to an occupant's input.

In accordance with another aspect of this invention, the positioning apparatus includes a carrousel supported for rotation about a carrousel axis. The carrousel may be a drum-type carrousel and may be supported for rotation about a generally horizontal axis.

In accordance with another aspect of this invention, the console assembly includes an access door movably supported across the module access opening. The door is shaped to cover the access opening in a closed position and is movable to an open position uncovering the access opening.

In accordance with another aspect of this invention, at least one of the modules comprises a built-in appliance such as a computer or fax machine. The appliances are incorporated into the design of the interchangeable modules and therefore into the design of the floor console, rather than being plugged into a cigarette lighter and placed on the floor, a seat, or the dashboard.

In accordance with another aspect of this invention, the console assembly includes an image display panel supported in a forward end of the console. This forward display panel can, for example, display navigational information or mechanical and electrical fault information to occupants.

In accordance with still another aspect of this invention, the console assembly includes an aft image display panel supported in an aft end of the console. The aft display panel can, for example, display computer game images to automobile rear-seat occupants.

In accordance with one final aspect of this invention, the console assembly includes at least one remote-control unit that may be operated by automobile rear-seat occupants in playing computer games displayed on the aft display panel.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
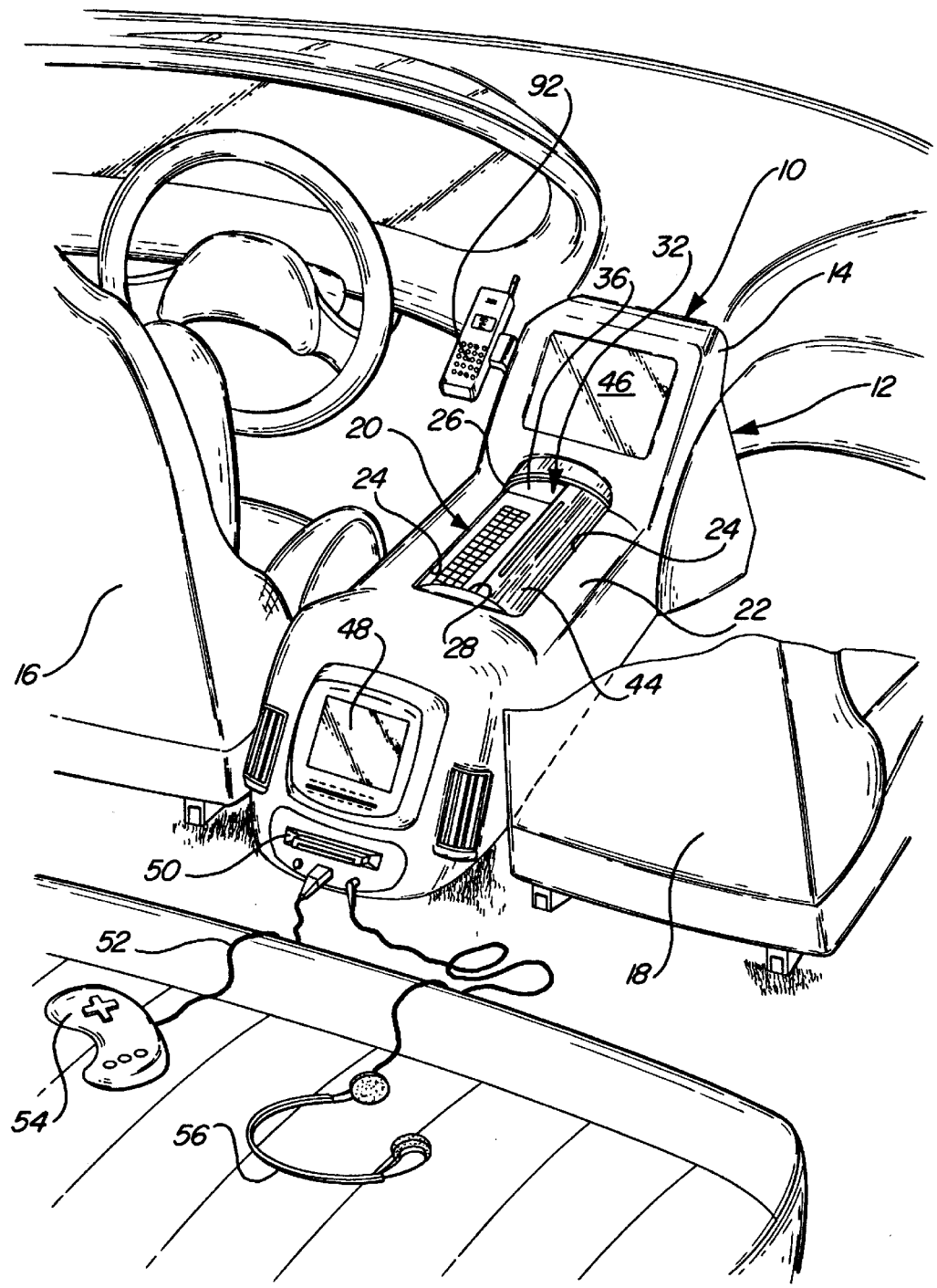
FIG. 1 is a perspective view of a floor console assembly constructed according to a first embodiment of the present invention and installed in a vehicle interior.
Figure 2:
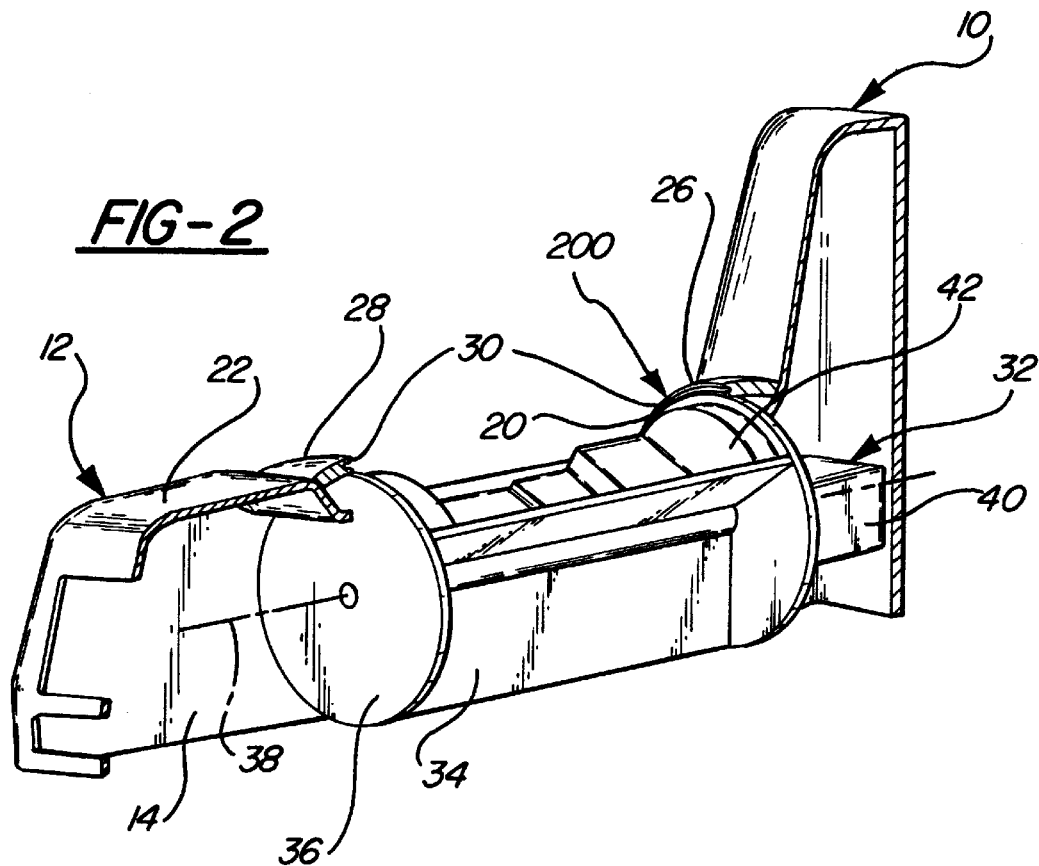
FIG. 2 is a cut-away perspective view of the floor console assembly of FIG. 1.
Figure 4:
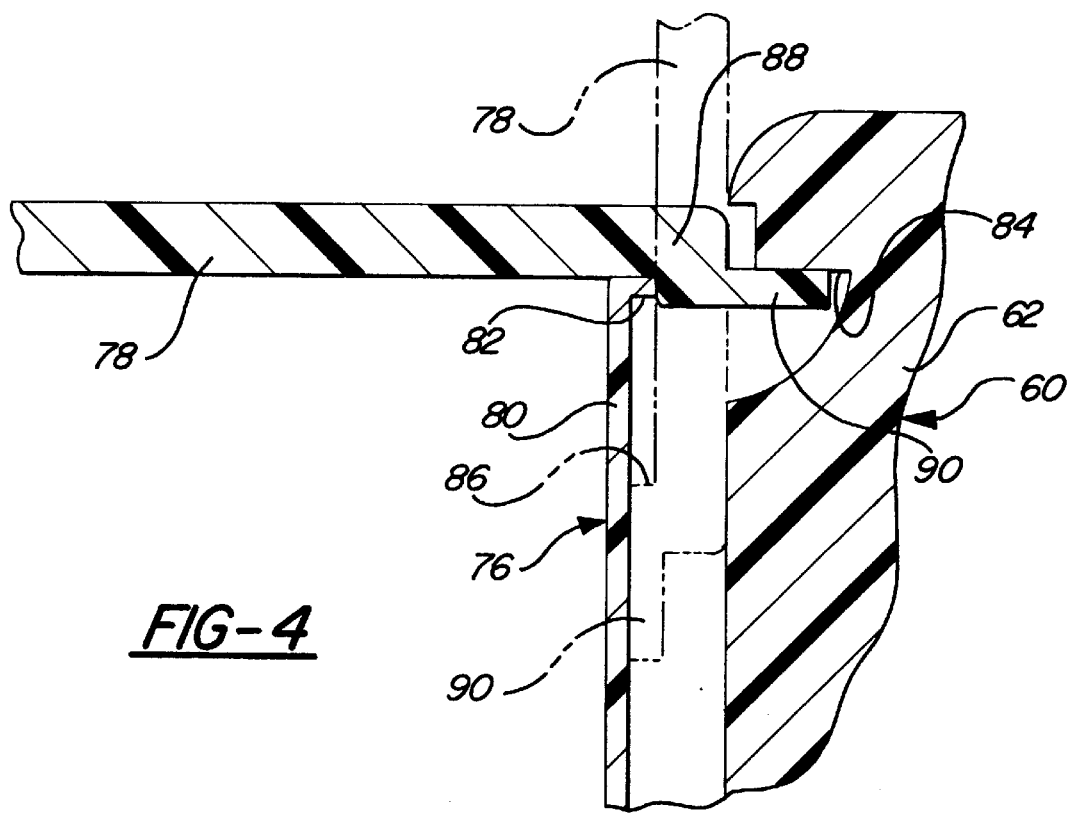
FIG. 4 is a cross-sectional end view of the floor console assembly of FIG. 3 taken along line 4—4 of FIG. 3.
Figure 3:
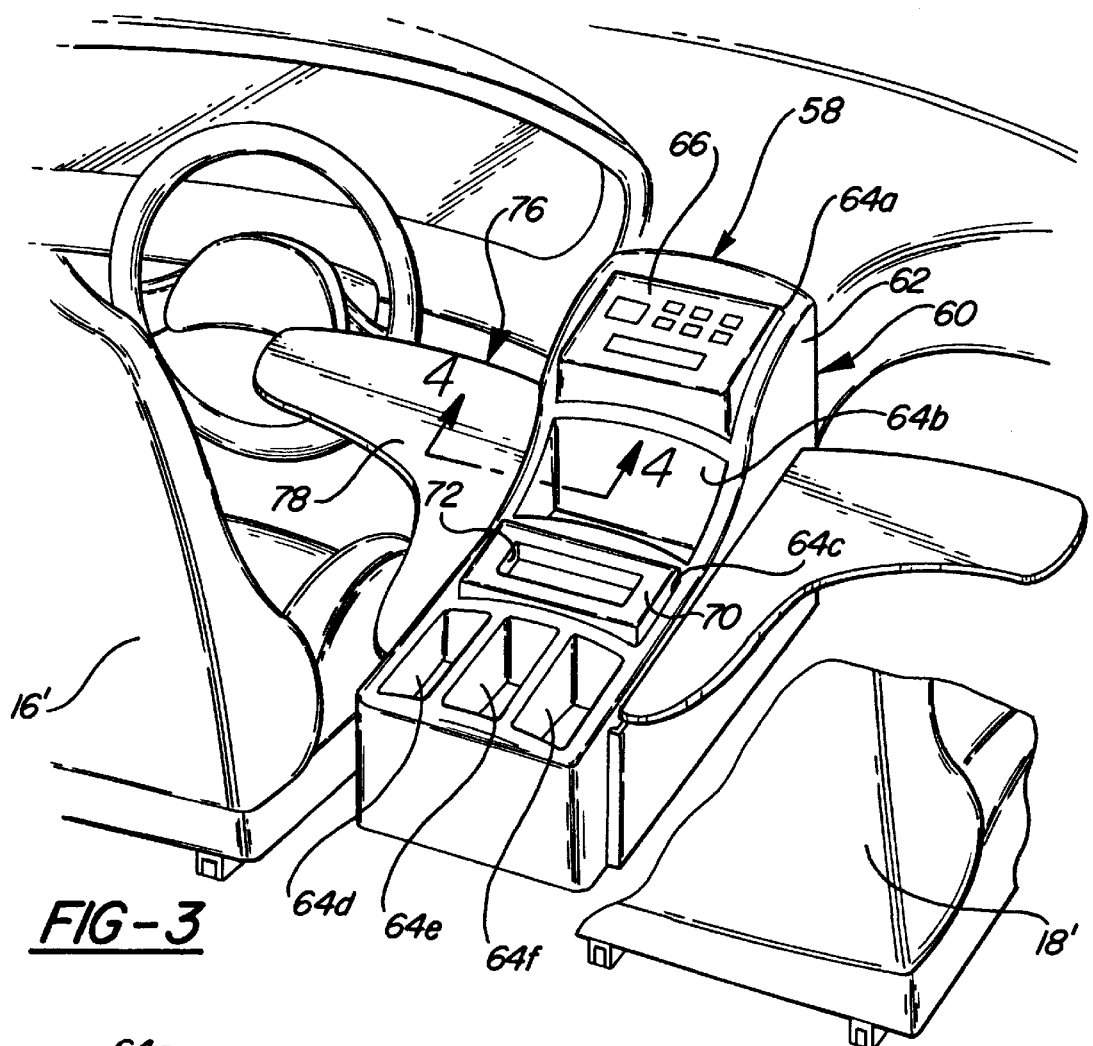
FIG. 3 is a perspective view of a floor console assembly constructed according to a second embodiment of the present invention and installed in a vehicle interior.
Figure 5:
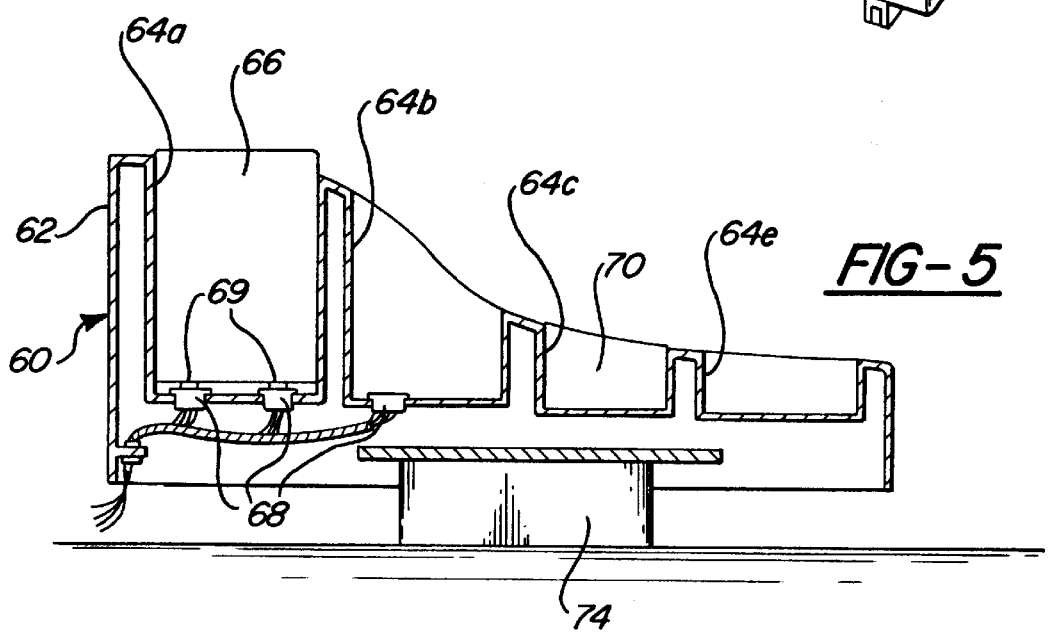
FIG. 5 is a cross-sectional side view of the floor console assembly of FIG. 3.

A first embodiment of a vehicle passenger compartment floor console assembly constructed according to the present invention is shown in FIGS. 1 and 2. FIGS. 3–5 illustrate a second embodiment of this invention.

The first embodiment of the claimed floor console assembly 10 is generally shown at 10 in FIG. 1, The floor console assembly 10 includes a console body 12 with an outer shell 14 having a size and shape that allow the console assembly 10 to fit in the area between the front driver seat 16 and the front passenger seat 18 of a motor vehicle. As shown in FIG. 1, the outer shell 14 has an elongated box shape with rounded corners and edges sculpted to flow into the interior contours of the automobile the console is installed in.

The first embodiment of the floor console assembly 10 includes an access opening 20 disposed in the console body outer shell 14. The access opening 20 is centrally located in an upper surface 22 of the outer shell 14 and is generally rectangular in shape. The access opening 20 is defined by a pair of straight side edges 24 and by upwardly curved forward 26 and aft 28 edges. The forward 26 and aft 28 edges each include a semi-circular groove 30.

As is best shown in FIG. 2, the first embodiment also includes a module positioning apparatus 32 that is movably supported within the console body outer shell 14. The positioning apparatus 32 comprises a drum-type carrousel 36 supported for rotation about a horizontal central carrousel axis 38. The carrousel axis 38 is aligned parallel to the direction that the immediately adjacent passenger seats 16, 18 are facing, i.e., the direction of vehicle travel.

As shown in FIG. 2, the positioning apparatus 32 may include an electro-mechanical occupant-actuated drive mechanism 40 and may also include an occupant-actuated automatic module selection system (not shown).

To select a module using the electro-mechanical drive mechanism 40 an occupant actuates the drive mechanism and causes it to continue rotating modules past the access opening until a desired module appears in the access opening 20. With the automatic selection system, an occupant momentarily depresses a button or key corresponding to the desired module which causes the drive mechanism 40 to rotate the carrousel until the selected module appears.

Three storage 34 and/or appliance 42 modules are supported on the positioning apparatus 32 for rotational movement within the console body outer shell 14. In other embodiments the positioning apparatus may carry only two modules or may carry more than three modules. Other embodiments may also move the modules in other than a rotational motion.

The shape of each storage module is a cylindrical section approximating an elongated triangular prism with a single elongated arcuate plane as shown at 34 in FIG. 2. Other embodiments may include modules having different sizes and shapes. Storage modules 34 may also include contoured inserts designed to nest one or more loose articles.

An appliance module 42 may have any shape so long as that shape allows the appliance module 42 to fit within the confines of its assigned space within the carrousel 36. In the case of a carrousel with three equal-size compartments or sections, as shown in FIG. 2, the appliance module 42 must fit within a space approximating that defined by storage module 34. However, the module compartments or sections need not have the same size and shape. Some modules be larger than others to accommodate larger appliances. Examples of the types of appliances that may be built into the appliance modules 42 include computers, fax machines, modems, cellular telephones and hair-driers.

The storage 34 and appliance 42 modules are sequentially rotatable through a displayed position adjacent the access opening 20. The displayed position is best shown in FIG. 2 as viewed through the access opening 20. The carrousel-type positioning apparatus 32 allows passenger compartment occupants to select and retrieve any one of the storage 34 or appliance 42 modules and to gain access to its contents through the access opening 20.

As shown in FIG. 1, an access door 44 is slidably supported in the semi-circular grooves 30. The access door 44 has an arcuate shape to cover the access opening 20 in a closed position and may be slid to an open position revealing and providing access to the contents of whichever module 34, 42 is in the presented position.

A forward image display panel 46 in the form of a cathode ray tube (CRT) is supported in a forward end of the console body 12. The forward image display panel 46 is positioned to display images primarily to the occupants of seats 16, 18 positioned on either side of the console assembly 10.

An aft image display panel 48, also in the form of a CRT, is supported in an aft end of the console body 12. The aft image display panel 48 is positioned to display images primarily to occupants seated behind the console assembly 10. Image-producing electronic circuitry is included in an electronic computer game module 50 connected to the aft display panel 48 and, in response to occupant inputs, transmits signals that produce images on the aft display panel 48. In other embodiments the image-producing electronic circuitry may not be included in a computer game module. It may, instead, be included in a device that, for example, converts broadcast microwave signals or information stored in magnetic media (video tape) into video images.

Occupant inputs to the electronic circuitry are passed through signal wires 52 from a remote-control unit 54. Audio signals may be transmitted to occupants via headphones 56. Occupant inputs may, alternatively, be passed from the remote control unit 54 to the image-producing electronic circuitry by electromagnetic transmissions instead of wires.

This first embodiment 10 of the present invention reduces clutter by providing occupants with selective access to any one of a number of different storage 34 and appliance 42 modules and storing non-selected modules inside the center console 12. The electro-mechanical drive mechanism 40 and occupant-actuated automatic module selection system allow a driver to gain access to a module while diverting a minimum amount of attention from the task of operating the vehicle. The image display panels 46, 48 are conveniently located to display information to front and rear seat occupants, respectively.

As with the first embodiment, and as is shown in FIG. 3, the floor console assembly 58 of the second embodiment has a console body 60 and outer shell 62 with a size and shape that allow the console assembly 58 to fit in the area between the front driver seat 16' and the front passenger seat 18' of a motor vehicle.

As shown in FIGS. 3 and 5, the second embodiment of the passenger compartment floor console assembly 58 includes six module receptacles 64a–f disposed in the console body 60 adjacent the outer shell 62. Each module receptacle 64a–f has the general shape of a rectangular prism. As is representatively shown at 66 in FIGS. 3 and 5, this embodiment also includes any number of interchangeable storage and appliance modules each having exterior dimensions that allow the modules 64 to fit within one or more of the module receptacles 64a–f.

As shown in FIG. 3, the module receptacles, 64a–f may include electrical hook-ups 68 such as power outlets, antenna connections, or various types of data transmission line connectors. These type of hook-ups 68 allow various electronic and electrical appliances such as hair driers, computers, printers, facsimile transmission machines, cellular telephones and modems to plug directly into a receptacle 64a–f for power and data transmission and reception.

Corresponding to the electrical hook-ups 68 of the module receptacles, at least one of the interchangeable storage 70 and appliance 66 modules includes an electrical hook-up 69 compatible with said module receptacle electrical hook-up 68. The receptacle hook-ups 68 and the module hook-ups 69 are positioned in locations where insertion of an appliance module 66 into a receptacle 64a will cause the hook-ups 68, 69 to interconnect when the module 66 is fully seated in the receptacle 64a as is best shown in FIG. 5.

An automobile purchaser may select a number of appliance 66 and storage 70 modules from an assortment of such modules available as dealer options accompanying the sale of a car that includes a console constructed according to the second embodiment of the present invention. In addition, the owner of an automobile having a console of this type may purchase various interchangeable appliance 66 and storage 70 modules from an after-market auto parts retailer.

In practice, vehicle occupants may store and gain access to frequently-used travel items and vehicle accessories by first selecting a module 66, 70 for use during driving, removing any module that might already be occupying the module receptacle 64a–f, and inserting the selected module into the module receptacle.

The storage version of the modules, as representatively shown at 70 in FIGS. 3 and 5, may have a contoured portion 72 designed to nest one or more loose articles of a particular shape and size such as cellular telephone. Such form-fitting interior contoured portions 72 prevent the noise and possible damage that can occur when stored items shift position within a module during vehicle accelerations. As alternatives to form-fitting contours, any one of a number of well-known fastening devices, such as retainer brackets, straps or hook-and-pile fasteners, may be included within a module to stabilize stored articles.

As is best shown at 74 in FIG. 5, a console repositioning mechanism allows vehicle occupants to adjust the position of the entire console vertically, horizontally and laterally. Occupants may use the console-repositioning mechanism 74 to move the console body 60 in any single one of these directions independent of motion in either of the remaining two directions.

Left and right-side lap-table assemblies are included on the respective left and right sides of the console. Each lap-table assembly is a mirror image of the other, so the following description of the left-side assembly, shown at 76 in FIGS. 3 and 4, will apply equally to the right side, only in reverse.

The left side lap-table assembly 76 includes a lap table 78 and a lap table receptacle 80. The lap table receptacle 80 is a vertically-oriented sleeve on the left side of the console body 60. As is best shown in FIG. 4, the receptacle 80 has a rectangular cross-section with dimensions slightly larger than that of the thickest portion of the lap table 78. At the top end of the sleeve is an up-stop detent 82 and a pivot-stop detent 84. The up-stop detent 82 is disposed in a position to contact an up-stop flange 86 formed into a bottom end of the lap table 78. The up-stop detent 82 and the up-stop flange 86 cooperate to prevent an occupant from completely lifting the lap table 78 out of the lap table receptacle 80 when attempting to deploy the lap table 78. Adjacent the up-stop flange 86 and running along the length of the lap table 78 bottom end is an elongated S-shaped bend 88 in the lap table 78. The lower end of the S-shaped bend 88 forms a pivot-stop flange 90. Once the lap table 78 has reached its upper limit of travel, the S-shaped bend 88 allows the lap table 78 to pivot outward and downward away from the console body 60 until the pivot-stop flange 90 contacts the pivot-stop detent 84. At the point where the pivot-stop flange 90 meets the pivot-stop detent 84 the lap table 78 is in a fully-deployed position. Stowage of the lap table 78 is a straight-forward reversal of the deployment procedure.

Alternatively, any one of a number of other well-known stowage and deployment systems may be used to mount the lap table 78 to the console body 60.

This second embodiment allows vehicle occupants to choose from a much larger selection of storage spaces and automotive appliances than would be available if they had to be permanently installed in the limited space available in a vehicle interior. The second embodiment also provides convenient stowable tables 78 for writing, reading or for placing food items while eating. The console repositioning mechanism 74 allows occupants to set the vertical, lateral and longitudinal position of the console body 60 to provide maximum occupant comfort and module accessibility.

This is an illustrative description of the invention using words of description rather than of limitation.

Obviously, many modifications and variations of this invention are possible in light of the above teachings. Within the scope of the claims, one may practice the invention other than as described.

I claim:

1. A vehicle passenger compartment floor console assembly comprising:

a console body having an outer shell;

an access opening disposed in said console body outer shell;

a positioning apparatus movably supported within said console body outer shell, said positioning apparatus comprising a carrousel supported for rotation about a carrousel axis;

at least two storage modules supported on said positioning apparatus for movement within said console body outer shell and between one or more concealed positions displaced from said access opening and a displayed position adjacent said access opening to provide a passenger compartment occupant selective access to any of said modules and their respective contents.

2. An automotive passenger compartment console assembly as defined in claim 1 wherein said positioning apparatus comprises an electromechanical occupant-actuated drive mechanism.

3. An automotive passenger compartment console assembly as defined in claim 2 wherein said positioning apparatus comprises an occupant-actuated automatic module selection system.

4. An automotive passenger compartment console assembly as defined in claim 1 wherein said modules are sequentially moveable through said displayed position.

5. An automotive passenger compartment console assembly as defined in claim 1 wherein said positioning apparatus comprises a drum-type carrousel supported for rotation about a generally horizontal axis.

6. An automotive passenger compartment console assembly as defined in claim 1 further including an access door movably supported across said module access opening, said door shaped to cover said access opening in a closed position and movable to an open position uncovering said access opening.

7. An automotive passenger compartment console assembly as defined in claim 1 wherein at least one of said modules comprises an appliance that is incorporated into the design of the module.

8. An automotive passenger compartment console assembly as defined in claim 1 wherein at least one of said modules comprises a storage space.

9. An automotive passenger compartment console assembly as defined in claim 1 further including a forward image display panel supported in a forward end of said console body.

10. An automotive passenger compartment console assembly as defined in claim 1 further including an aft image display panel supported in an aft end of said console body and image-producing electronic circuitry connected to said aft display panel.

11. An automotive passenger compartment console assembly as defined in claim 10 further including at least one remote-control unit communicable with said electronic image-producing circuitry.

* * * * *